(12) United States Patent
Uchiyama et al.

(10) Patent No.: US 8,009,987 B2
(45) Date of Patent: Aug. 30, 2011

(54) OPTICAL ADD/DROP MULTIPLEXER

(75) Inventors: Yasuhiro Uchiyama, Yokohama (JP);
Yukio Hayashi, Yokohama (JP);
Chanthan Winh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 713 days.

(21) Appl. No.: 12/068,539

(22) Filed: Feb. 7, 2008

(65) Prior Publication Data

US 2008/0285973 A1    Nov. 20, 2008

(30) Foreign Application Priority Data

May 16, 2007  (JP) ................................ 2007-130403

(51) Int. Cl.
*H04J 14/00* (2006.01)
*H04J 14/02* (2006.01)
*H04B 10/08* (2006.01)
*H04B 17/00* (2006.01)

(52) U.S. Cl. ................ 398/83; 398/82; 398/79; 398/43; 398/33

(58) Field of Classification Search .................... 398/33, 398/82, 83, 43, 79, 85
See application file for complete search history.

(56) References Cited

U.S. PATENT DOCUMENTS

| 5,617,234 | A * | 4/1997 | Koga et al. .................. 398/14 |
| 6,980,742 | B1 * | 12/2005 | Liden et al. .................. 398/85 |
| 7,634,196 | B2 * | 12/2009 | Gerstel et al. .................. 398/83 |
| 2004/0161234 | A1 * | 8/2004 | Ozawa .......................... 398/33 |
| 2005/0226621 | A1 | 10/2005 | Kikuchi et al. |
| 2006/0072918 | A1 * | 4/2006 | Gerstel et al. .................. 398/83 |

FOREIGN PATENT DOCUMENTS

| JP | 2004-032088 | 1/2004 |
| JP | 2005-286721 | 10/2005 |
| JP | 2006-101470 | 4/2006 |
| JP | 2007-104103 | 4/2007 |

* cited by examiner

*Primary Examiner* — Ken N Vanderpuye
*Assistant Examiner* — Mancil Littlejohn
(74) *Attorney, Agent, or Firm* — McDermott Will & Emery LLP (57) ABSTRACT

There is provided a shutdown controller that monitors the temperature of an optical multiplexer and maximizes the loss of an optical attenuator when a temperature monitor result is abnormal. An optical level change detection circuit section is disposed with respect to an optical level monitor of individual monitors in an optical add/drop multiplexer. An optical level monitor of a total main signal is disposed downstream of the optical multiplexer. The inconsistency of the wavelength number is detected by comparing the total of the optical level monitors of the individual channels with the optical level value of the optical level monitor, upon which shutdown control is performed in which the loss of the optical attenuator is maximized in only the channel whose optical level change is detected by the optical level change detection circuit section.

8 Claims, 7 Drawing Sheets

MAIN SIGNAL THAT HAS
PASSED THROUGH VARIABLE
OPTICAL ATTENUATOR

FIG. 4B

MAIN SIGNAL THAT HAS
PASSED THROUGH OPTICAL
MULTIPLEXER

OPTICAL ADD/DROP MULTIPLEXER

CLAIM OF PRIORITY

The present application claims priority from Japanese patent application serial no. 2007-130403, filed on May 16, 2007, the content of which is hereby incorporated by reference into this application.

BACKGROUND OF THE INVENTION

The present invention relates to an optical add/drop multiplexer used in a wavelength multiplexing technology, and more particularly to an optical add/drop multiplexer that transfers wavelength number information without any error.

With the higher capacity of a data communication represented by the Internet technology, a rapid increase in the information content and an increase in a transmission capacity are expected in an optical transmission system, and in order to meet the above demands, there is applied a wavelength multiplexing technology that bundles plural optical signals different in the wavelength in one optical fiber to conduct a communication. In recent years, there is being constituted a communication network using an optical add/drop multiplexer that not only conducts a high-capacity transmission between two points apart from each other by using the wavelength multiplexing technology, but also adds and drops an optical signal in each of one wavelengths between plural points.

Figure 1:
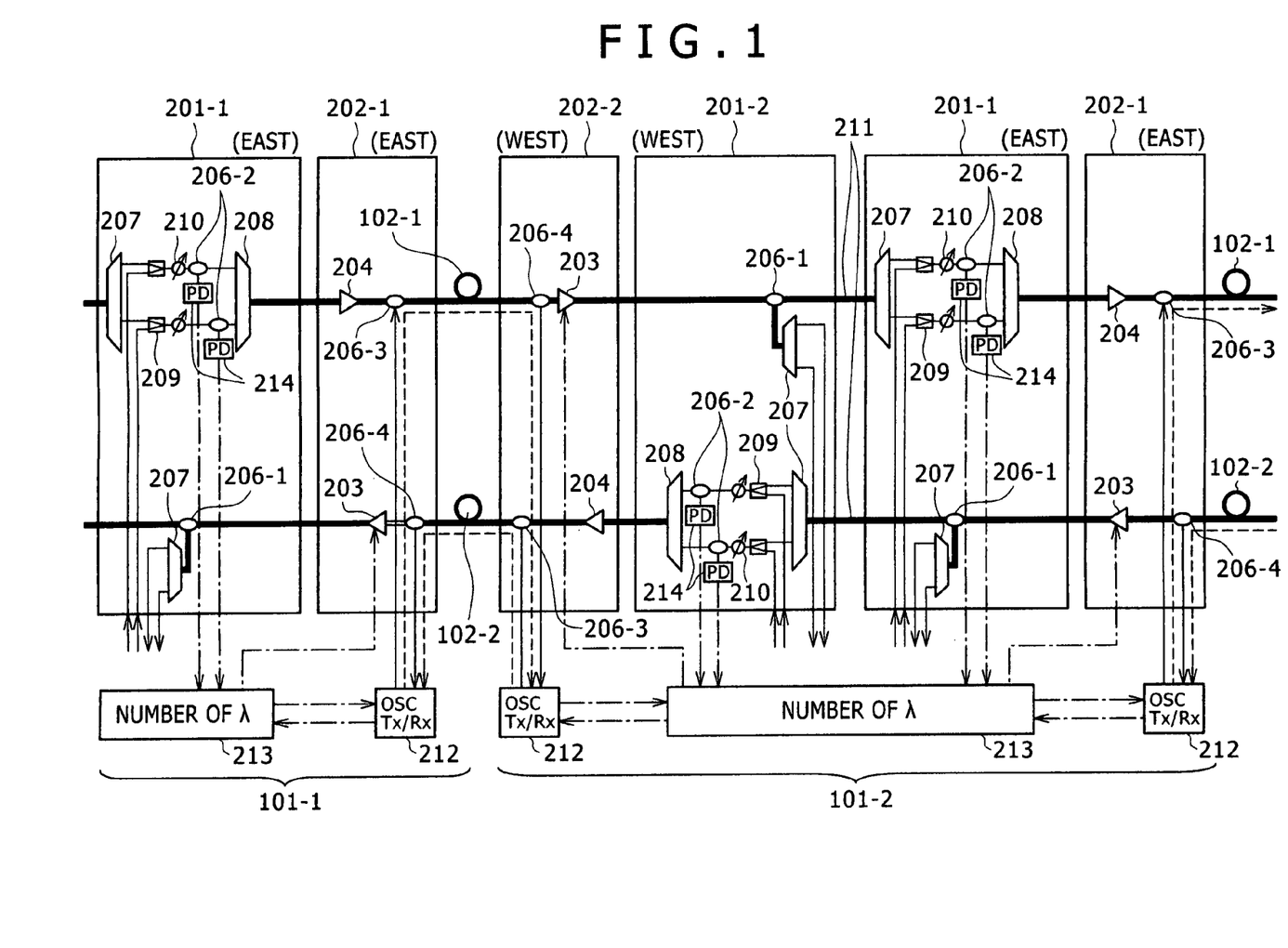
FIG. 1 is a block diagram showing a communication system.

A part of the communication network using the optical add/drop multiplexer will be described with reference to FIG. 1. FIG. 1 is a block diagram showing a communication system. FIG. 1 shows a structure in which sections of an optical add/drop multiplexer 101-1 and an optical add/drop multiplexer 101-2 are extracted from an optical network of a ring topology. The optical add/drop multiplexer 101-1 shown in the figure is only a device structure at an east side. In FIG. 1, solid lines indicate the flow of a main signal, and dotted lines indicate the flow of an OSC signal. Also, dashed lines indicate a supervisory channel electric signal.

First, the optical add/drop multiplexers 101-1 and 101-2 are made up of an optical amplifier section (west) 202-2, an optical amplifier section (east) 202-1, an optical add/drop multiplex section (west) 201-2, and an optical add/drop multiplex section (east) 201-1. The optical amplifier section 202 includes a receiver optical amplifier 203 that amplifies an input optical signal from an optical fiber transmission line 102, and transmits the amplified input optical signal to the optical add/drop multiplex section 201, and a transmitter optical amplifier 204 that amplifies the input optical signal from the optical add/drop multiplex section 201, and transmits the amplified input optical signal to the optical fiber transmission line 102. The optical add/drop multiplex section 201 includes an optical drop section having an optical coupler 206-1 and an optical demultiplexer 207, and an optical transmission/add select section having an optical demultiplexer 207, an optical multiplexer 208, optical switches 209, variable optical attenuators 210, optical couplers 206-2 that drop a part of an optical output after the variable optical attenuator 210, and photo detectors 214 that monitor a dropped optical signal of the optical coupler 206-2.

Hereinafter, a description will be given of the operation of the entire optical add/drop multiplexer 101 with reference to the flow of a main signal in a direction of from west to east in the optical add/drop multiplexer 101-2 shown in FIG. 1. The received optical signal from the optical add/drop multiplexer 101-1 is amplified by the receiver optical amplifier 203 of the optical amplifier section (west) 202-2 in the optical add/drop multiplexer 101-2, and is then transmitted to the optical add/drop multiplex section (west) 201-2.

The optical add/drop multiplex section (west) 201-2 branches the optical signal into two optical signals by the optical coupler 206-1, and one of those optical signals is further branched into optical signals in each of the wavelengths by the optical demultiplexer 207, and output from a dropped optical signal port. The other optical signal is transmitted to the optical add/drop multiplex section (east) 201-1 through an optical fiber 211 that connects between the optical add/drop multiplex sections 201.

The optical add/drop multiplex section (east) 201-1 is demultiplexed to optical signals in each of the wavelengths by the optical demultiplexer 207, and input to the optical switches 209. The optical switches 209 select a transmitted optical signal from west or an added optical signal. The variable optical attenuators 210 that are disposed downstream of the optical switches 209 are disposed in order to uniform the optical power levels of the respective wavelengths over the entire wavelengths, and the photodetectors 214 monitor the optical levels, and the optical levels of the respective channels are held constant under the control. The optical signals having the optical power levels uniformed by the variable optical attenuators 210 are again wavelength multiplexed by the optical multiplexer 208, and then transmitted to the optical amplifier section (east) 202-1.

In the optical amplifier section (east) 202-1, the optical signal is amplified by the transmitter optical amplifier 204, and thereafter again transmitted to the optical fiber transmission line 102.

Hereinafter, the optical supervisory channel (OSC) signal of the optical add/drop multiplexer will be described. The optical supervisory channel signal of the optical add/drop multiplexer functions to transfer the used wavelength number of the main signal between the optical add/drop multiplexers 101 so as to normally operate the optical amplifier 202. The function of transferring the wavelength number between the optical add/drop multiplexers is essential in the case where the optical amplifier implements the optical level constant control that holds the optical signal per one wavelength constant on the basis of the wavelength number information. Under the optical level constant control, because the optical output level that is a target of the optical amplifier is determined according to the wavelength number information, there occurs a difference between the optical output level that is actually required and a target optical output level that is calculated on the basis of the erroneous wavelength number information, which lead to an error in the main signal.

Referring to FIG. 1, the receiver optical amplifiers 203 operate under the optical level constant control. Wavelength number information acquisition and transfer sections 213 detect the wavelength number information within the optical add/drop multiplexer, and notify the detected information to OSC signal transmitter/receiver sections 212. Also, the wavelength number information acquisition and transfer sections 213 receive the wavelength number information that has been transferred from the optical add/drop multiplexer of another node from the OSC signal transmitter/receiver sections 212, and notify the receiver optical amplifiers 203 of the received information. The OSC signal transmitter/receiver sections 212 convert the wavelength number information of the node which has been transmitted from the wavelength number information acquisition and transfer sections 213 into an optical signal, and transmit the converted optical signal to a downstream optical add/drop multiplexer 101. Also, the OSC signal transmitter/receiver sections 212 receive the OSC signal that has been transmitted from an upstream optical add/drop multiplexer 101 through the transmission line 102, extract the wavelength number information from the OSC signal, and transmit the wavelength number information to the wavelength number information acquisition and transfer sections 213 as an electric signal. The OSC signals are separated from the main signal by a optical coupler 206-4 upstream of the receiver optical amplifier 203, and multiplexed with the main signal by the poststage optical coupler 206-3 downstream of the transmitter optical amplifier 204.

Figure 2A:
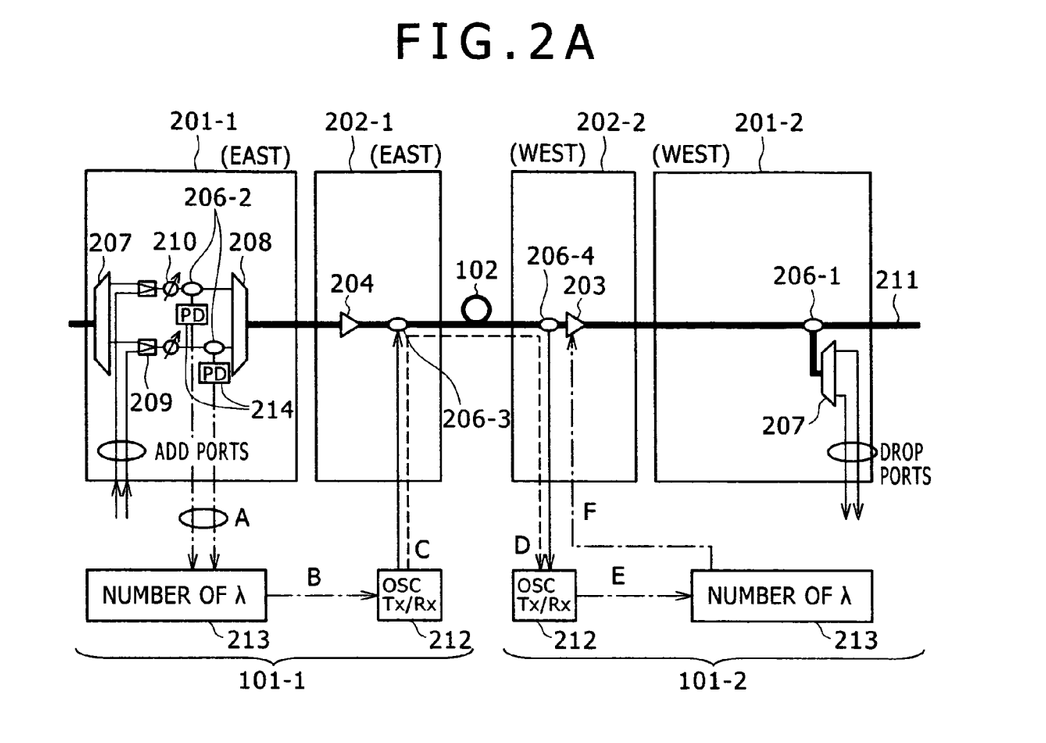
FIGS. 2A and 2B are block diagrams for explaining the transfer of wavelength number information.
Figure 2B:
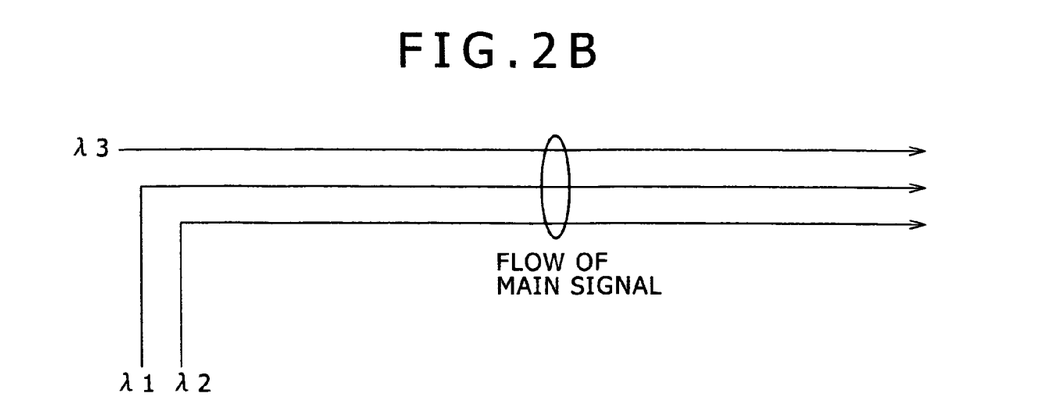

The transfer of the wavelength number information will be described with reference to FIGS. 2A and 2B. FIGS. 2A and 2B are block diagrams for explaining the transfer of the wavelength number information. FIG. 2A is a diagram that extracts a function of transferring the wavelength number from the east direction of the optical add/drop multiplexer 101-1 to the west direction of the optical add/drop multiplexer 101-2 from the communication system that is described with reference to FIG. 1. FIG. 2B is a diagram for explaining the flow of a main signal.

Referring to FIG. 2A, alphabets A to E represent operating order in the wavelength number transfer control. Referring to FIG. 2B, in the optical add/drop multiplexer 101-1, the optical signals of wavelengths $\lambda 1$ and $\lambda 2$ are multiplexed by the optical add/drop multiplex section (east) 201-1, and an optical signal of a wavelength $\lambda 3$ is transmitted through the optical add/drop multiplexer 101-1. In this case, the optical level can be first observed at a position A by only the optical level monitor 214 of $\lambda 1$, $\lambda 2$ and $\lambda 3$, and the optical level of other wavelengths cannot be observed. Accordingly, the wavelength information acquisition and transfer section 213 recognizes that the wavelength number is observed by three wavelengths at the position A from the optical level monitors (photo detectors) 214. The wavelength number information of the three wavelengths is transferred to the OSC signal transmitter/receiver section 212 from the wavelength information acquisition and transfer section 213 at a position B. The OSC signal transmitter/receiver section 212 converts the wavelength number information of the three wavelengths which has been electrically received at the position B into an optical signal, and transmits the optical signal at a position C. The optical signal that has been transmitted at the position C is multiplexed with the main signal by the optical coupler 206-3 of the optical amplifier (east) 202-1, and then transmitted to the optical add/drop multiplexer 101-2. The optical add/drop multiplexer 101-2 first demultiplexes the OSC optical signal and the main signal by the optical coupler 206-4, and the OSC signal transmitter/receiver section 212 receives the OSC optical signal. The OSC signal transmitter/receiver section 212 converts the received OSC optical signal into an electric signal from the optical signal at a position D, and receives the wavelength number information of the three wavelengths which has been acquired by the optical add/drop multiplexer 101-1. The received wavelength number information is transmitted to the wavelength number information acquisition and transfer section 213 at a position E. The wavelength number information acquisition and transfer section 213 transmits the received wavelength number information to the receiver optical amplifier 203 of the node at a position F. Upon receiving the wavelength number information, the receiver optical amplifier 203 determines a target value of the output optical level on the basis of the wavelength number information of the three wavelengths, and conducts the optical amplification of the main signal so as to meet the target output level.

Japanese Patent Laid-Open No. 2005-286721 discloses a technique in which in order to prevent the wavelength of an add optical signal from being erroneously set, a part of a optical signal that is multiplexed in wavelength by a wavelength multiplexer is reflected by a reflector, and detected by a backward detector of the wavelength multiplexer that multiplexes the add optical signal. United States Patent Application Publication 2005/0226621 A1 is a counterpart application of JP Patent Laid-Open No. 2005-286721.

In the above background art, the wavelength number is counted up in a wavelength demultiplexed state. For that reason, there may occur a difference between the wavelength division multiplexed wavelength number and the wavelength number that is normally multiplexed in the wavelength. More specifically, when the optical multiplexer is in failure or the wavelength of the added optical signal is in error, there occurs an error in the wavelength number.

The technique disclosed in Japanese Patent Laid-Open No. 2005-286721 is capable of detecting the wavelength error of the added optical signal, but a large number of optical parts are required. Also, there is no disclosure of the failure of the optical multiplexer.

SUMMARY OF THE INVENTION

An object of the present invention is to solve the above problems, and the object can be achieved by an optical add/drop multiplexer that superimposes multiwavelength number information of a main optical signal that has been multiplexed in wavelength on an optical supervisory channel (OSC) signal, and multiplexes and transmits the main optical signal and the OSC signal, including: a first optical level monitor that monitors the total power of the main optical signal; and plural second optical level monitors that detect the presence or absence of individual optical signals that are separated in wavelength, wherein a first multiwavelength number that is detected by the first optical level monitor is compared with a second multiwavelength number that is obtained from the plurality of second optical level monitors.

Also, the above object can be achieved by an optical add/drop multiplexer, including: an optical demultiplexer that demultiplexes a first wavelength division multiplexed optical signal in wavelength to generate plural first individual optical signals; plural switches that input each of the plurality of first individual optical signals and each of plural second individual optical signals to select any one of the first individual optical signals and the second individual optical signals; and an optical multiplexer that multiplexes plural third individual optical signals that are output from the plurality of switches in wavelength to generate a second wavelength division multiplexed optical signal, wherein the optical multiplexer includes a temperature monitor, and when the temperature monitor detects an abnormality, the generation of the second wavelength division multiplexed optical signal is stopped.

BRIEF DESCRIPTION OF THE DRAWINGS

Preferred embodiments of the present invention will now be described in conjunction with the accompanying drawings, in which.

DESCRIPTION OF THE PREFERRED
EMBODIMENTS

Hereinafter, a description will be given of embodiments with reference to the accompanying drawings.

The same parts are indicated by like reference numerals, and their description will not be duplicated.

First Embodiment

In the wavelength number transfer function in the optical add/drop multiplexer described in the background, there is a case in which an erroneous wavelength number is transferred downstream. This will be described in the following items (1) and (2).

(1) Failure of optical demultiplexer 208 of optical add/drop multiplex section 201 in optical add/drop multiplexer.

As the optical demultiplexers 207 and 208 in the optical add/drop multiplex section, there is used a glass waveguide optical device that is called arrayed waveguide grating (AWG). In the above optical demultiplex function device, the transmission characteristic of a main signal has a temperature dependency, and in order to allow the transmission of the main signal with the minimum loss, the temperature constant control is implemented with respect to the optical demultiplexer.

Figure 3A:
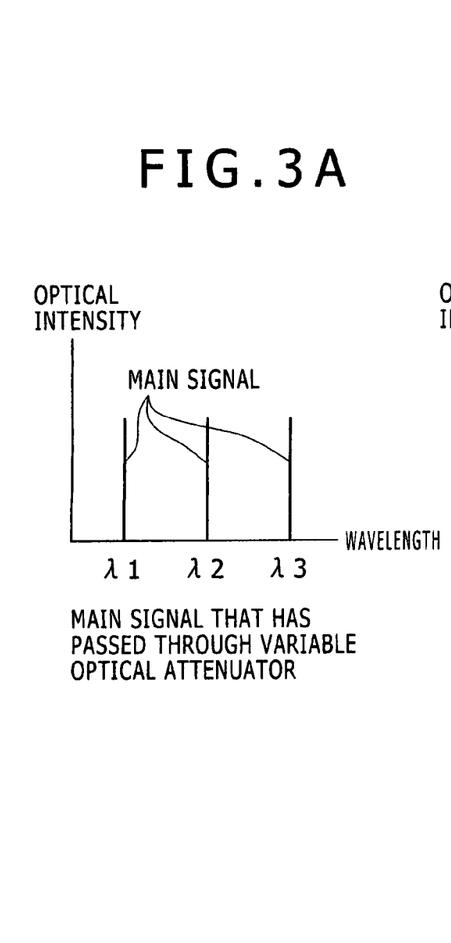
FIGS. 3A to 3C are diagrams for explaining the wavelength to optical intensity characteristics at respective points of an optical add/drop multiplexer.
Figure 3B:
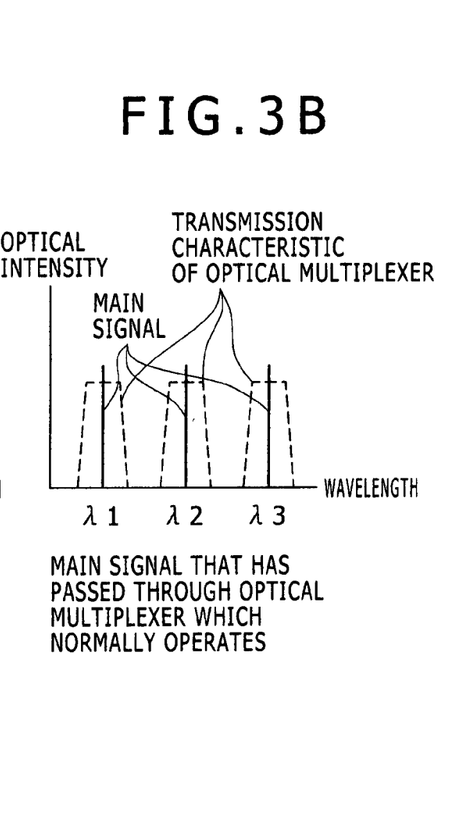
Figure 3C:
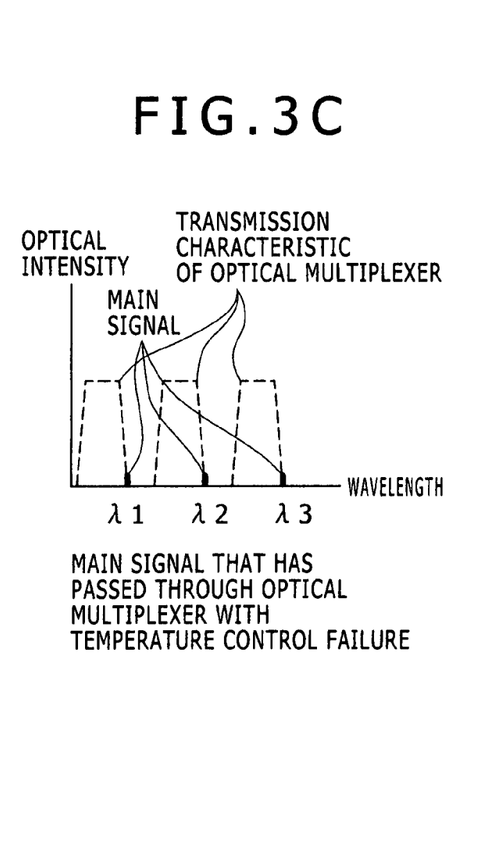

A description will be given of the transmission characteristics when the temperature constant control portion of the optical multiplexer 208 fails, and the main signal cannot be transmitted with the minimum loss in the optical add/drop multiplex section with reference to FIG. 3. FIGS. 3A and 3B are diagrams for explaining the wavelength to optical intensity characteristics at the respective points of the optical add/drop multiplexer. Referring to FIG. 3A, the optical signals of wavelengths $\lambda 1$, $\lambda 2$, and $\lambda 3$ immediately after having passed through a variable optical attenuator 210, which are main signals, are normal as shown in FIG. 3A. Accordingly, a wavelength number information acquisition and transfer section 213 of an optical add/drop multiplexer 101-1 recognizes that the wavelength number is 3. When the optical multiplexer 208 normally operates, the main signal transmission characteristics of the optical multiplexer 208 and the center wavelength of the main signal coincide with each other as shown in FIG. 3B. As a result, the main signals $\lambda 1$, $\lambda 2$, and $\lambda 3$ are transmitted to an optical amplifier 202-1 through the optical multiplexer 208, and an optical add/drop multiplexer 101-2 can receive the main signal of a normal level.

On the other hand, when the temperature constant control portion of the optical multiplexer 208 fails, the peak wavelength of the transmission characteristics of the optical multiplexer 208 is more deviated from the center wavelength of the main signals $\lambda 1$, $\lambda 2$, and $\lambda 3$ as the peak wavelength is more deviated from the temperature constant control target value. Accordingly, the main signals $\lambda 1$, $\lambda 2$, and $\lambda 3$ do not transmit through the optical multiplexer 208, and only the main signal of a weak optical level reaches the optical amplifier 202-1. However, the main signals $\lambda 1$, $\lambda 2$, and $\lambda 3$ immediately after having passed through an optical attenuator 210 normally operate, and the wavelength number information that is three wavelengths is transferred to the optical add/drop multiplexer 101-2 through an OSC signal. Accordingly, although the main signals $\lambda 1$, $\lambda 2$, and $\lambda 3$ transmit very weak optical level, the optical amplifier 202-2 operates with a very high optical amplification factor so as to reach the target optical level of the three wavelengths. This leads to an increase in the main signal noise level. Further, the main signal high in the noise level whose transmission quantity is deteriorated is further transmitted to a downstream node of the optical add/drop multiplexer 101-2 or lower.

(2) Erroneous addition of another wavelength optical signal into optical add/drop multiplex section 201 add port in optical add/drop multiplexer.

Figure 4A:
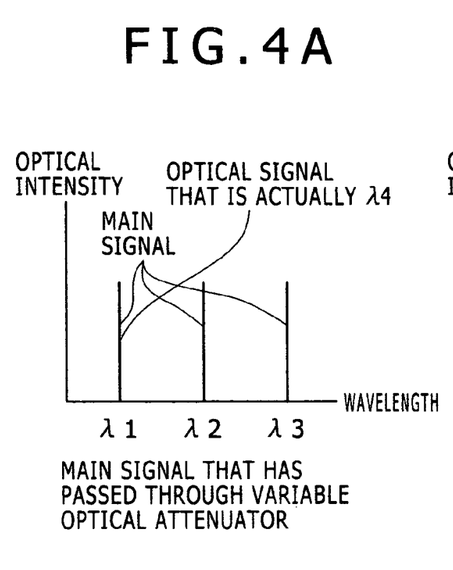
FIGS. 4A and 4B are diagrams for explaining the wavelength to optical intensity characteristics at respective points of the optical add/drop multiplexer.
Figure 4B:
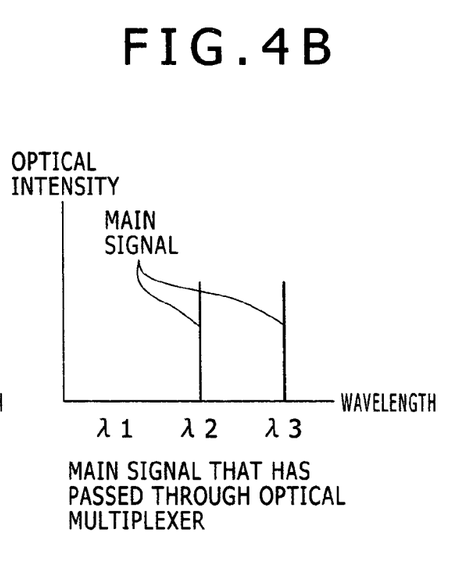

Referring to FIGS. 4A and 4B, a description will be given of the operation when the main signal $\lambda 4$ that is another main signal is erroneously added to a port to which the main signal $\lambda 1$ of the optical add/drop multiplexer 101-1 should be added. FIGS. 4A and 4B are diagrams for explaining the wavelength to optical intensity characteristics at the respective points of the optical add/drop multiplexer. In this case, at the monitor point that has passed through the optical attenuator 210, even if the signal $\lambda 4$ that is different in the wavelength is added, the optical coupler 206-2 does not have a function of filtering the optical signal, as a result of which it appears that the wavelength of $\lambda 1$ exists in the optical level monitor 214 as shown in FIG. 4A. On the other hand, the optical multiplexer 208 does not transmit the wavelength $\lambda 4$ even if the main signal of the wavelength $\lambda 4$ is added to the input port of the wavelength $\lambda 1$. As a result, as the main signals that are outputs of the optical multiplexer 208, there exist only two signals of $\lambda 2$ and $\lambda 3$. On the other hand, the wavelength number information acquisition and transfer section 213 transfers the wavelength number of 3 to the optical add/drop multiplexer 101-2 since the three optical level monitors 214 detect the main signals. The receiver optical amplifier 203 of the optical add/drop multiplexer 101-2 tries to amplify the main signal according to the target level of the three wavelengths. However, since there exist the main signals of only the two wavelengths $\lambda 2$ and $\lambda 3$, the main signals of $\lambda 2$ and $\lambda 3$ are resultantly output with an optical level higher than an expected value.

Figure 5:
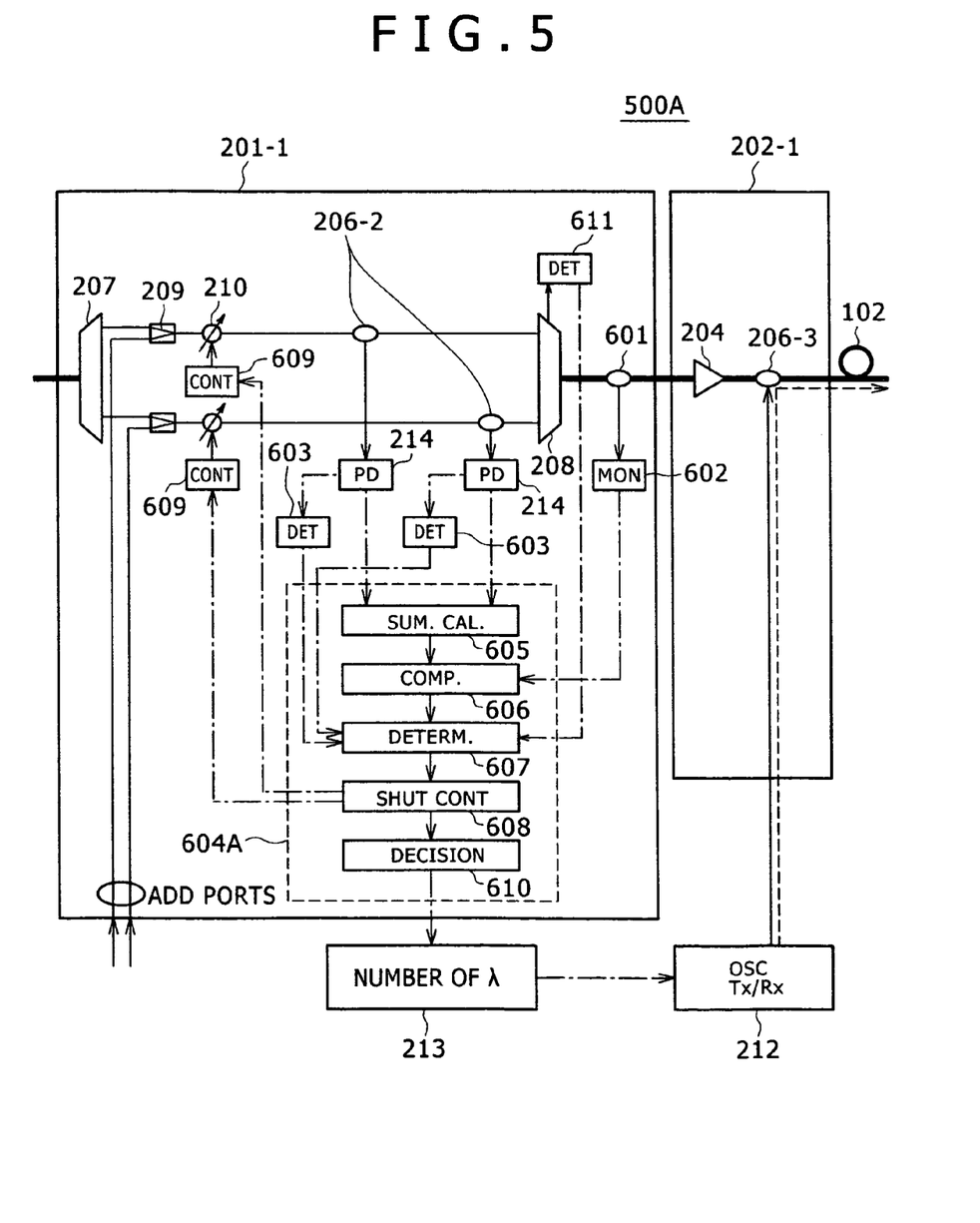
FIG. 5 is a block diagram showing the optical add/drop multiplexer.

Referring to FIG. 5, the configuration of the optical add/drop multiplexer will be described. FIG. 5 is a block diagram showing the optical add/drop multiplexer. In FIG. 5, only the east side of the optical add/drop multiplexer 500A is described, and differences from FIG. 1 will be described below. First, in the optical parts, an optical coupler 601 and an optical level monitor 602 for monitoring the main signal optical level that is transmitted through the optical multiplexer are added downstream of the optical multiplexer 208 of the optical add/drop multiplex section 201-1. An electronic circuit control section is added with a temperature monitor/temperature abnormality detector 611 that monitors the temperature of the optical multiplexer 208 and detects the temperature abnormality of the optical multiplexer. Also, optical level change detection sections 603 that detect that the optical level changes in a short period of time is provided in addition to the optical level monitors 214 of the individual channels. The optical level change detection section 603 detects whether a remarkable change of the optical level occurs during a read cycle, or not, on the basis of a difference between the optical level monitor value that has been read previously and the optical level monitor value that has been currently read in the optical level monitor that periodically monitors the optical level. Also, a wavelength number information extraction section 604A is made up of a summation calculation section 605, an optical level comparison section 606, an optical-level-changed channel judge section 607, an optical shutdown controller 608, and a wavelength number information determination section 610.

First, the optical level monitor summation calculation section 605 adds all of the optical levels of the optical level monitors 214 from the individual channels together, and obtains the summation results. The calculation results are equal to the expected value of the optical level that has passed through the optical multiplexer 208.

Subsequently, the optical level comparison section 606 compares the calculation results that have been obtained in the summation calculation section 605 of the optical level monitor with the optical level monitor results that have passed through the optical multiplexer 208 at the optical level monitor 602. When the comparison results coincide with each other, the main signal expected value due to the calculation coincides with the main signal optical level that has actually passed through the optical multiplexer 208, and the wavelength number information of the main signal coincides with each other. When the comparison results do not coincide with each other, it is meant that the wavelength number of the main signal which is actually transmitted to the downstream node does not coincide with the wavelength number information that is detected by the optical add/drop multiplex section.

The optical-level-changed channel judge section 607 determines whether the optical-level-changed channel judgment is required, or not, on the basis of the detection results of the temperature abnormality detector 611 as a result of comparison in the optical level comparison section 606. First, when the temperature abnormality is detected by the temperature abnormality detector 611, the optical-level-changed channel judge section 607 determines that the optical level change occurs in all of the channels. When no temperature abnormality occurs in the temperature abnormality detector 611, and the optical level comparison results in the optical level comparison section 606 coincide with each other, the optical-level-changed channel judge section 607 determines that no optical level change occurs in all of the channels. Only when no temperature abnormality occurs in the temperature abnormality detector 611, and the optical level comparison results in the optical level comparison section 606 do not coincide with each other, the optical-level-changed channel judge section 607 specifies the channel where a remarkable optical level change occurs in the read cycle by the aid of the detection signal of the main signal optical level change detection section 603.

The optical shutdown controller 608 notifies an optical attenuator controller 609 so as to shut down the optical attenuator 210 with respect to the optical level change occurrence channel which is determined in the optical-level-changed channel judge section 607. When the temperature abnormality is detected by the temperature abnormality detector 611, the optical shutdown controller 608 issues a shutdown control instruction to the optical attenuator controllers 609 of all the channels. When the temperature abnormality detector 611 detects no temperature abnormality is detected, and the optical level comparison section 606 determines that the main signal comparison results do not coincide with each other, the optical shutdown controller 608 issues a shutdown control instruction so as to shut down the optical attenuator controller 609 in only the channel where the optical level change that is determined by the optical-level-changed channel judge section 607 occurs. In other cases, the optical shutdown controller 608 issues no shutdown control instruction, and do nothing.

After the shutdown control instruction has been issued, the wavelength number information determination section 610 decides the final wavelength number information that is notified of the wavelength number information acquisition and transfer section 213. More specifically, the wavelength number information determination section 610 transmits the final wavelength number information obtained by subtracting only the channel number that receives the shutdown control instruction from the wavelength number that is detected by the individual channel optical level monitors 214 to the wavelength number information transfer control section 213.

With the section operation of the summation calculation section 605, the optical level comparison section 606, the optical-level-changed channel judge section 607, the optical shutdown controller 608, and the wavelength number information determination section 610 in the optical level monitor as one loop, those sequential section operation is cyclically conducted, thereby making it possible to precisely transfer the wavelength number information to the downstream node without notifying the erroneous wavelength number information.

The operation at the time of generating the above event will be described below. First, at the time of detecting the temperature abnormality of the optical multiplexer 208, the temperature abnormality detector 611 detects the temperature abnormality operation, and notifies the optical-level-changed channel judge section 607 of the temperature abnormality detection. The optical-level-changed channel judge section 607 detects the temperature abnormality, and determines that the optical level change occurs in all of the channels. Under the circumstances, the optical shutdown controller 608 notifies the optical attenuator controllers 609 of all the channels of the shutdown instruction, and the wavelength number information determination section 610 notifies that the wavelength number information is 0 wavelength.

Subsequently, when the optical signal of another wavelength is erroneously added to the add port of the optical add/drop multiplex section 201-1, there occurs an inconsistency of the optical signal in the optical level comparison section 606 between the expected value from the calculation results of the main signal and the optical level monitor comparison result that has passed through the optical multiplexer 208 by one wavelength. For that reason, the optical-level-changed channel judge section 607 specifies the channel where the optical level change occurs by adding the optical fiber. The optical shutdown controller 608 instructs the shutdown control to the optical attenuator 210 of the channel where the optical level change occurs. The wavelength number information determination section 610 notifies the wavelength number information acquisition and transfer section 213 of the wavelength number (2 wavelengths in this case) from which one wavelength that issues the shutdown control instruction is subtracted.

Figure 6:
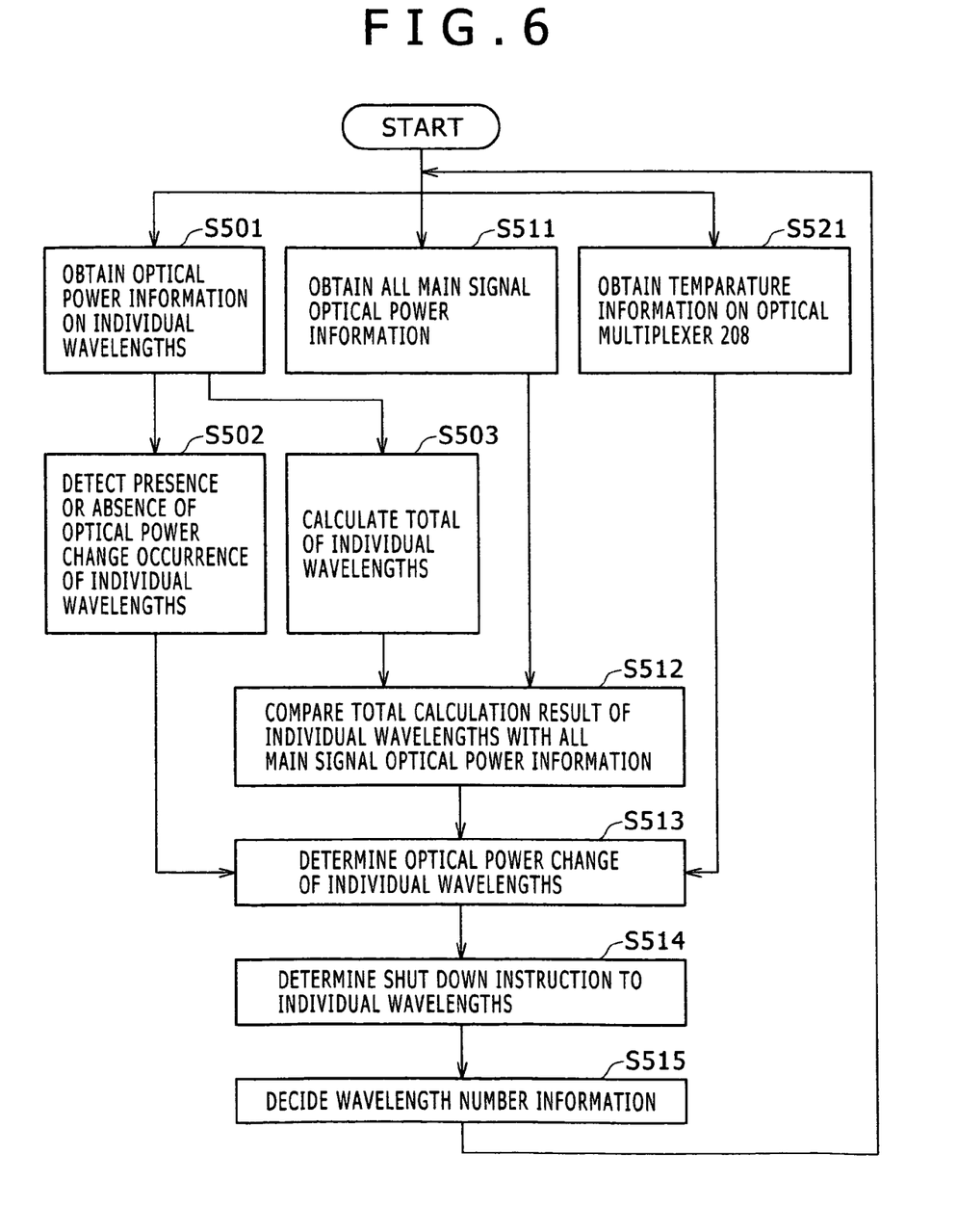
FIG. 6 is a flowchart showing the control of the optical add/drop multiplexer.

Referring to FIG. 6, the control flow of the optical add/drop multiplexer will be described. FIG. 6 is a control flowchart of the optical add/drop multiplexer. Referring to FIG. 6, when the optical add/drop multiplexer 500A is turned on, the optical level monitors 214 of the plural individual wavelengths acquires the optical power information of the corresponding wavelength (S501). Also, the optical power monitor 602 acquires all of the main signal optical power information (S511). The optical multiplexer temperature monitor/temperature abnormality detector 611 acquires the temperature information of the optical multiplexer 208 (S521).

Subsequently to Step S501, the optical level change detection section 603 detects the change occurrence presence/absence of the optical powers of the individual wavelengths (S502). Also, the summation calculation section 605 calculates the summation of the respective individual wavelengths "presence" (S503). The comparison section 606 compares the wavelength number obtained in Step S511 with the wavelength number obtained in Step S503, and determines whether there is an inconsistency in the wavelength number information, or not (S512).

The optical level monitor change occurrence channel determination section 607 determines whether the abnormality occurs in any channel (wavelength), or not, on the basis of the results in Steps 502, 512, and 521 (S513). Further, the shutdown controller 608 instructs the shutdown to the channel where the abnormality occurs (S514). The wavelength number information determination section 510 decides the wavelength number information (S515), and returns to Steps 501, 511, and 521.

According to this embodiment, even when the optical add/drop multiplexer detects the erroneous wavelength number information, it is possible to prevent the erroneous wavelength number to the downstream node, and avoid the transmission quality deterioration of the main signal after the downstream node.

Second Embodiment

Figure 7:
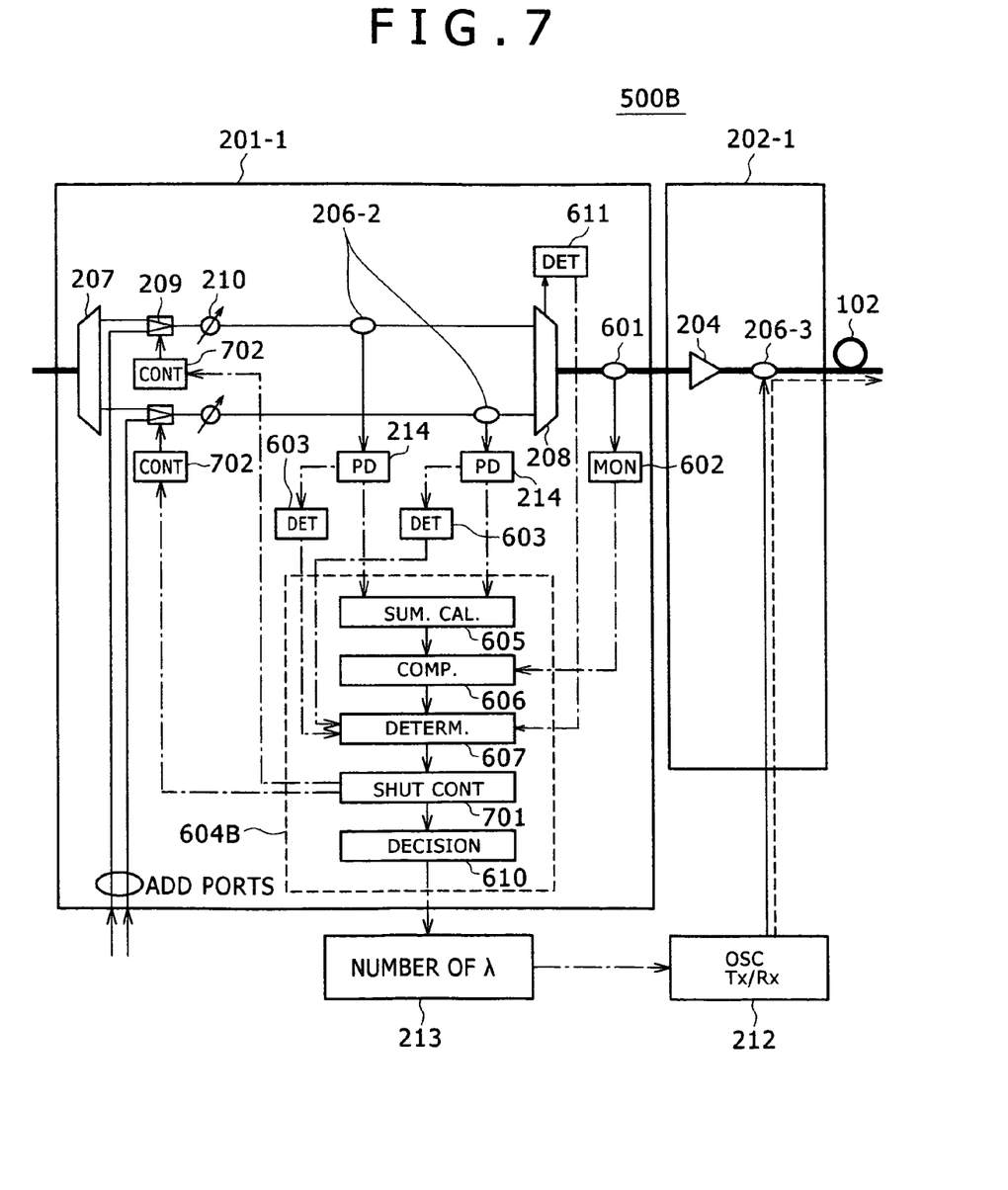
FIG. 7 is a block diagram showing the other optical add/drop multiplexer.

A second embodiment will be described with reference to FIG. 7. FIG. 7 is a block diagram showing the optical add/drop multiplexer. In this example, only the east side of the optical add/drop multiplexer 500B is described, and differences from FIG. 5 will be described below. In the optical add/drop multiplex section 201-1, not only the loss maximum control of the optical attenuator 210 but also the shutdown control is conducted by changing over the optical switches 209 of the individual channels in the shutdown control of the individual channels. Because it is necessary to shut down the output to the optical attenuator 210 under the switch changeover control, the optical switch 209 is an optical switch with two inputs and two outputs. When the optical attenuator 210 is connected to a first output of the optical switch 209, an optical terminator not shown is connected to a second output.

The shutdown controller 608 of the optical attenuator in the wavelength number information extraction section 604A shown in FIG. 5 is replaced with a shutdown controller 701 of the optical switch in the wavelength number information extraction section 604B. The shutdown controller 701 allows an optical switch changeover controller 702 to operate so as to select the second output. The optical switch changeover controller 702 is omitted from FIG. 5. According to the present invention, even when the mode changes over to a fault mode that affects the main signal quality of the optical add/drop multiplex section or when an erroneous main signal is added to the add port due to the erroneous connection of the optical fiber in the optical add/drop multiplex section in the optical add/drop multiplexer, it is possible to transfer the erroneous wavelength number to the downstream node, and to avoid the transmission quality deterioration of the main signal after the downstream node.

What is claimed is:

1. An optical add/drop multiplexer that superimposes multiwavelength number information of a main optical signal subjected to wavelength division multiplex on an OSC signal, and multiplexes and transmits the main optical signal and the OSC signal, the optical add/drop multiplexer comprising:
a first optical level monitor that monitors a total power of the main optical signal; and
a plurality of second optical level monitors that detect presence or absence of individual optical signals separated into wavelengths, respectively,
wherein a first multiwavelength number corresponding level detected by the first optical level monitor is compared with a second multiwavelength number corresponding to a sum of optical levels detected by the plurality of second optical level monitors.

2. The optical add/drop multiplexer according to claim 1, further comprising a plurality of change detection sections that are connected to the plurality of second optical level monitors, respectively, and detect that optical level changes between read cycles.

3. The optical add/drop multiplexer according to claim 2, wherein when the first multiwavelength number and the second multiwavelength number are different from each other, the change detection sections stop a transmission of each individual optical signal of a wavelength whose change is detected.

4. The optical add/drop multiplexer according to claim 3, wherein the transmission of the individual optical signals is stopped by route changeover due to an optical switch.

5. The optical add/drop multiplexer according to claim 3, further comprising a plurality of variable optical attenuators that adjust optical levels of the individual optical signals,
wherein said transmission of the individual optical signals is stopped due to attenuation given by the variable optical attenuator.

6. An optical add/drop multiplexer, comprising:
an optical demultiplexer that demultiplexes a first wavelength division multiplexed optical signal in wavelength to generate a plurality of first individual optical signals;
a plurality of switches that input each of the plurality of first individual optical signals and each of a plurality of second individual optical signals to select any one of the first individual optical signals and the second individual optical signals; and
an optical multiplexer that multiplexes a plurality of third individual optical signals that are output from the plurality of switches in wavelength to generate a second wavelength division multiplexed optical signal,
wherein said optical multiplexer includes a temperature monitor, and when the temperature monitor detects an abnormality, a generation of the second wavelength division multiplexed optical signal is stopped.

7. The optical add/drop multiplexer according to claim 6, wherein said generation of the second wavelength division multiplexed optical signal is stopped due to route changeover by the switch.

8. The optical add/drop multiplexer according to claim 6, further comprising a plurality of variable optical attenuators that adjust optical levels of the plurality of third individual signals,
wherein said generation of the second wavelength division multiplexed optical signal is stopped due to the attenuation of the variable optical attenuator.

* * * * *